United States Patent
Addy (10) Patent No.: US 8,205,800 B2
(45) Date of Patent: Jun. 26, 2012

(54) LONG RANGE SELECTIVE RFID USING LASER PHOTODETECTION WAKEUP

(75) Inventor: Ken Addy, Massapequa, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 142 days.

(21) Appl. No.: 12/581,937

(22) Filed: Oct. 20, 2009

(65) Prior Publication Data

US 2011/0091216 A1 Apr. 21, 2011

(51) Int. Cl.
*G06K 19/06* (2006.01)
*G06K 7/08* (2006.01)
*G06K 7/00* (2006.01)
*G08B 13/14* (2006.01)

(52) U.S. Cl. ........ 235/492; 235/451; 235/439; 235/440; 340/572.1; 340/10.1

(58) Field of Classification Search .................. 235/435, 235/439, 455, 454, 451, 492; 340/572.1–572.9, 340/10.1
See application file for complete search history.

(56) References Cited

U.S. PATENT DOCUMENTS

| | | | |
|---|---|---|---|
| 5,134,277 A * | 7/1992 | Yerbury et al. | 250/214 RC |
| 5,825,045 A * | 10/1998 | Koenck et al. | 250/566 |
| 5,874,724 A | 2/1999 | Cato | |
| 6,830,181 B1 | 12/2004 | Bennett | |
| 7,154,395 B2 * | 12/2006 | Raskar et al. | 340/572.4 |
| 7,652,557 B2 * | 1/2010 | Kantrowitz et al. | 340/10.34 |
| 2004/0012496 A1 | 1/2004 | DeSouza et al. | |
| 2004/0100834 A1* | 5/2004 | Waters | 365/200 |

(Continued)

FOREIGN PATENT DOCUMENTS

GB 2395613 A 5/2004

(Continued)

OTHER PUBLICATIONS

Zhou, Yu, and Liu, Wenfei, "Preliminary Research on Indoor Mobile Robot Localization using Laser-activated RFID", Mar. 26-28, 2007, pp. 78-85, vol. 1-4244-1013-4/07, 2007 IEEE International Conference on RFID, Gaylord Texan Resort, Grapevine, TX, USA.
Roberti, Mark, "Sensing New RFID Opportunities", pp. 1 and 2, printed Sep. 30, 2009 from http://www.rfidjournal.com/article/print/2081, RFID Journal.

(Continued)

*Primary Examiner* — Michael G Lee
*Assistant Examiner* — Suezu Ellis
(74) *Attorney, Agent, or Firm* — Hiscock & Barclay, LLP (57) ABSTRACT

A data transfer system includes a radio frequency identification (RFID) reader having a radio frequency transmitter and receiver and a laser. The data transfer system also includes a RFID tag on a container which has a first photosensitive device coupled to an electronic circuit in the tag which is in a first state when light from the laser is not striking the photosensitive device and in a second state when light from the laser is striking the photosensitive device such that the RFID tag transmits a signal only when a light beam from the laser is striking the photosensitive device. The tag may be passive, semi-passive (battery assisted passive-BAP), or active. If the tag is BAP then the laser light causes the tag to wake up so that it can respond to the RF signal from a RFID reader. The radio frequency transmitter provides power to the RFID tag sufficient to transmit a signal to the receiver which can be decoded by the RFID reader when the RFID reader is 40 feet or more away from the RFID tag.

15 Claims, 5 Drawing Sheets

U.S. PATENT DOCUMENTS

| | | | |
|---|---|---|---|
| 2005/0040241 A1* | 2/2005 | Raskar | 235/492 |
| 2005/0116813 A1* | 6/2005 | Raskar | 340/10.1 |
| 2006/0127097 A1 | 6/2006 | Obrea et al. | |
| 2006/0164291 A1* | 7/2006 | Gunnarsson | 342/51 |
| 2006/0202802 A1* | 9/2006 | Seppa | 340/10.3 |
| 2007/0035381 A1* | 2/2007 | Davis | 340/10.1 |
| 2007/0040683 A1* | 2/2007 | Oliver et al. | 340/572.1 |
| 2007/0069030 A1* | 3/2007 | Sauerwein et al. | 235/462.46 |
| 2007/0132592 A1* | 6/2007 | Stewart et al. | 340/572.8 |
| 2007/0205272 A1 | 9/2007 | Daddabbo et al. | |
| 2008/0169977 A1 | 7/2008 | Payne et al. | |
| 2008/0315994 A1* | 12/2008 | Maltseff et al. | 340/10.1 |
| 2009/0009288 A1* | 1/2009 | Fogg | 340/10.1 |
| 2009/0294535 A1* | 12/2009 | Paeschke et al. | 235/439 |
| 2010/0231407 A1* | 9/2010 | Carr | 340/691.1 |
| 2012/0000985 A1* | 1/2012 | Bove | 235/492 |

FOREIGN PATENT DOCUMENTS

| | | |
|---|---|---|
| WO | WO 0016253 A1 | 3/2000 |
| WO | WO 03071477 A1 | 8/2003 |
| WO | WO 2006061780 A1 * | 6/2006 |
| WO | WO2006073129 A1 | 7/2006 |

OTHER PUBLICATIONS

Author Unknown, "A Basic Introduction to RFID Technology and its Use in the Supply Chain", Jan. 2004, pp. 1-30.

Knight, Will, "Laser TFID Tags", pp. 1 and 2, printed Jun. 18, 2009 from http://www.newscientist.com/blog/invention/2006/11/laser-rfid-tags_03.html.

European Patent Office, European Search Report for corresponding EP Application No. 10178984.0-2210, dated Dec. 10, 2010 (3 pgs.).

* cited by examiner

LONG RANGE SELECTIVE RFID USING LASER PHOTODETECTION WAKEUP

FIELD OF THE INVENTION

This invention relates to Radio Frequency Identification (RFID), and more particularly to long range selective RFID using laser photodetection wakeup

BACKGROUND OF THE INVENTION

In the Automatic Identification and Data Collection (AIDC) industry long range barcode reading is generally achieved using laser scanning or 2D imaging. Both methods have drawbacks, primarily due to poor signal to noise ratio of the detected signal. For example, when using a laser detector, the beam must be focused over a long distance to ensure that a barcode can be read.

RFID is not typically used in these applications because RFID is non-directional, so targeting a specific item to be read is difficult in an environment when there may be many RFID tags essentially co-located.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures.

Conventionally, a reader, whether portable or otherwise, may include a central processor which directly controls the operations of the various electrical components housed within the bar code reader. For example, the central processor controls detection of keyboard entries, display features, trigger detection, and bar code read and decode functionality.

Efforts regarding such systems have led to continuing developments to improve their versatility, practicality and efficiency.

BRIEF DESCRIPTION OF THE DRAWINGS

The aforementioned and other features, characteristics, advantages, and the invention in general will be better understood from the following more detailed description taken in conjunction with the accompanying drawings, in which.

It will be appreciated that for purposes of clarity and where deemed appropriate, reference numerals have been repeated in the figures to indicate corresponding features. Also, the relative size of various objects in the drawings has in some cases been distorted to more clearly show the invention.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art.

Figure 1:
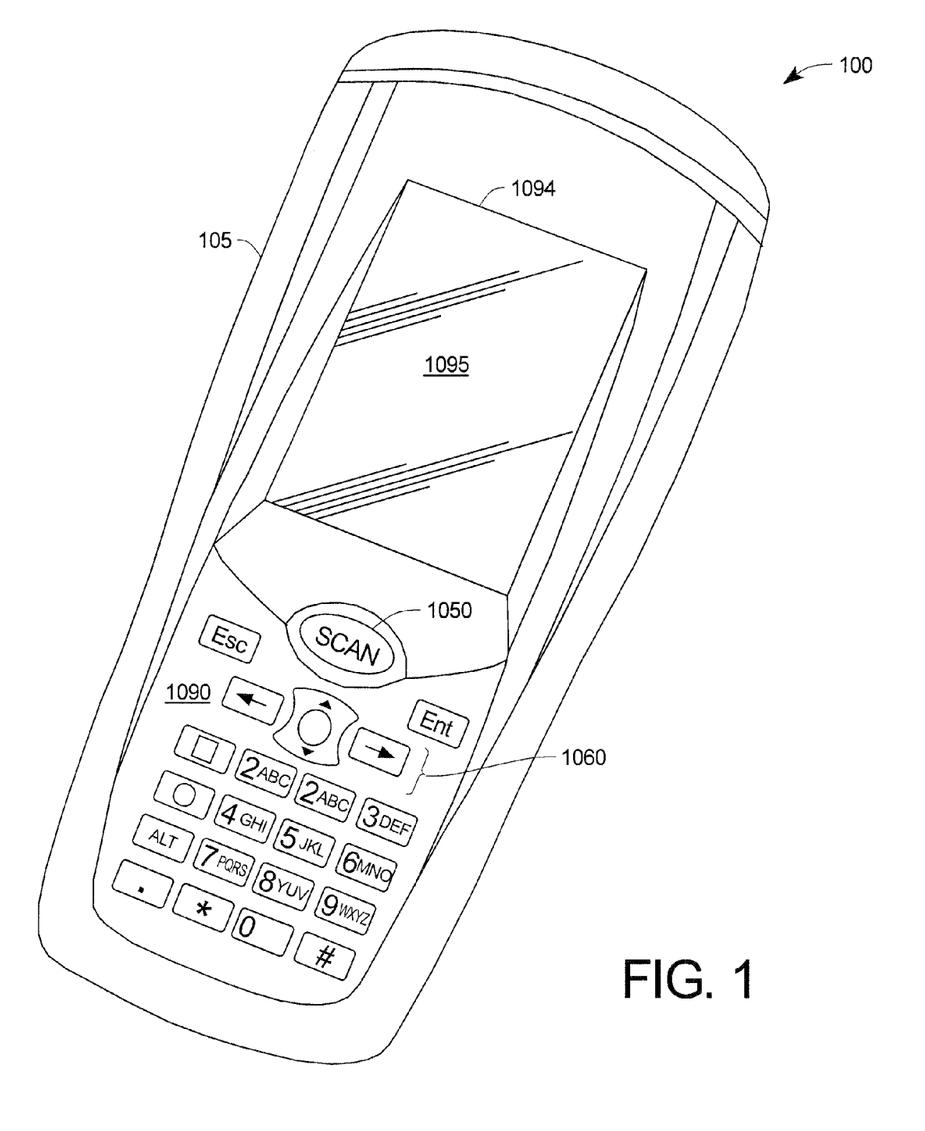
FIG. 1 is a perspective view of an indicia reader in accordance with at least one embodiment of the present invention.

Referring to FIG. 1, an exemplary hand held indicia reading device 100 which may be a portable data terminal (PDT) (referred to as "PDT 100") has a case 105, a display 1094 under a touch screen 1095, and a keypad 1090. The keypad 1090 includes a scan button 1050 and pointer controller keys 1060. The touch screen 1095 and keypad 1090 provide inputs to control the operation of the electronics and imaging assembly inside the case 105 of the PDT 100.

Figure 2:
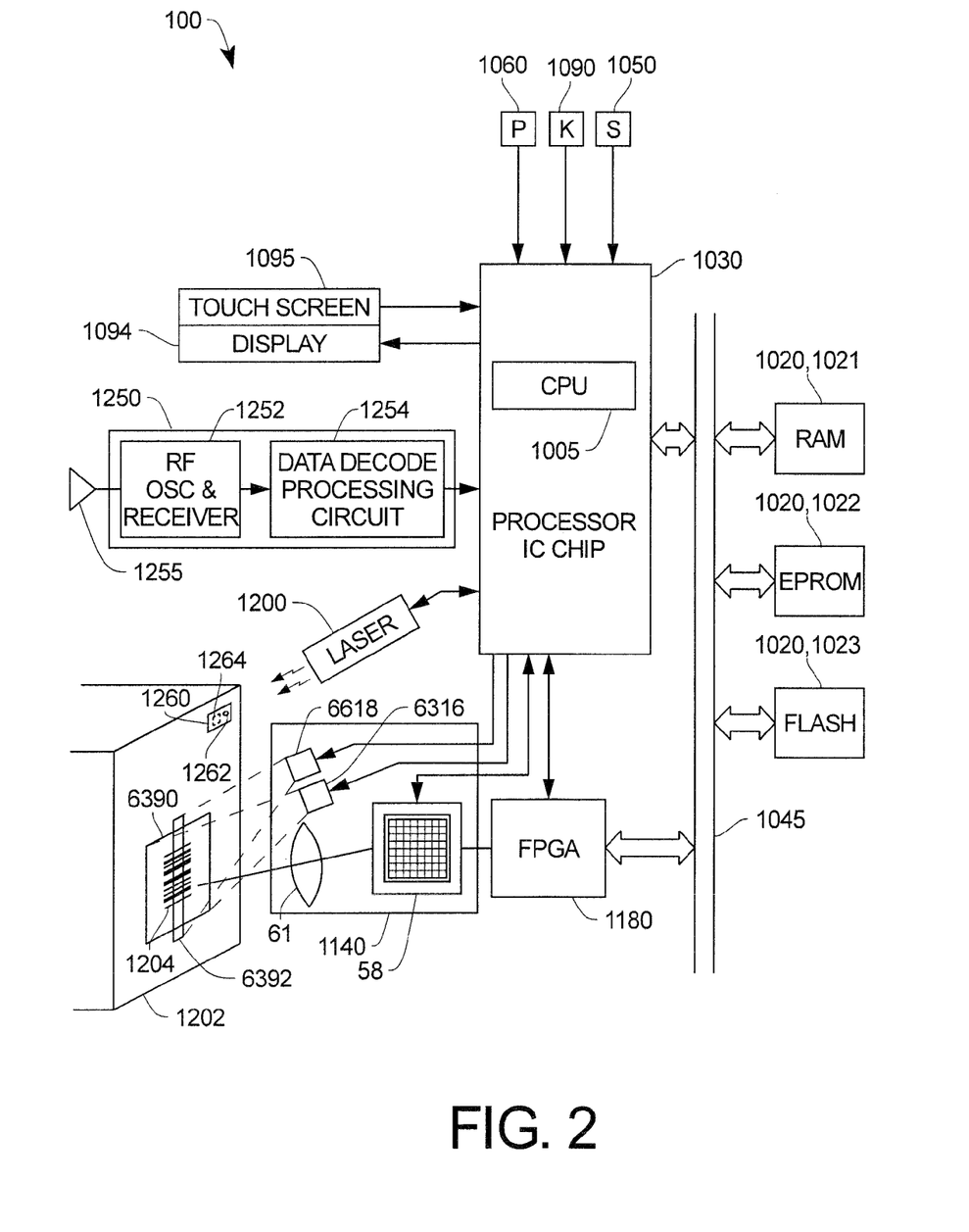
FIG. 2 is a partial block diagram of the indicia reader of FIG. 1.

A block diagram of the PDT 100, incorporating a laser 1200 which operates in conjunction with a RFID reader unit 1250 according to an embodiment of the invention, is shown in FIG. 2. By operation of a processor IC chip 1030, PDT 100 receives and processes various inputs from the RFID reader unit 1250 and an imaging module 1140, and controls various outputs such as the output of various collected transaction data to the display 1094 and to other terminals via wireless transmission modules (not shown). In the embodiment of FIG. 2, processor IC chip 1030 includes a central processing unit or CPU 1005. In addition to the CPU 1005 memory 1020 may be incorporated partially or entirely in processor IC chip 1030 and partially or entirely in a plurality of memory IC chips such as EPROM IC chip 1022, RAM IC chip 1021, and flash IC chip 1023. EPROM IC chip 1022, RAM IC chip 1021, and flash IC chip 1023 or other nonvolatile storage devices may be in communication with microprocessor IC chip 1030 via system bus 1045. Processor IC chip 1030 operates in accordance with an Operating System (OS) which is typically loaded into RAM 1021 when data collection device 100 is booted up. The device's operating system enables processor IC chip 1030 to recognize input from user input interface components, e.g., scan button 1050, keyboard/keypad 1090, and touch screen 1095, to send output to output interfaces, e.g., display 1094, to schedule tasks, to manage files and directories and to control other components such as input/output devices. Examples of suitable operating systems for PDT 100 include WINDOWS XP, LINUX, WINDOWS CE, OSX.

PDT 100 may include a graphical user interface ("GUI") which may include a pointer. The pointer is moved by an operator using the pointer controller keys 1060 to select between various displayed (sometimes referred to as "virtual") control buttons displayed on display 1094. Virtual control buttons may also be displayed for selecting between various menu options. PDT 100 can be configured so that displayed menu options are selected by physically depressing a displayed icon or text, with use of a finger or stylus, on the touch screen 1095.

The RFID reader unit 1250 shown in FIG. 2 includes an RF oscillator and receiver section 1252 and a data decode processing circuit 1254. The RFID reader unit 1250 may be configured to read RF encoded data from a RFID tag, such as tag 1260, which may be disposed on an container 1202. Where RFID reader unit 1250 is configured to read RF encoded data from a RFID tag 1260, RF oscillator and receiver circuit 1252 transmits a carrier signal from antenna 1255 to tag 1260. RFID tag 1260 converts the carrier energy to a DC voltage to power the tag 1260 and a transponder in tag 1260 is actuated to transmit a radio signal representing the encoded tag data. RF oscillator and receiver circuit 1252, in turn, receives the radio signal from the tag and converts the data into a digital format. Data decode processing circuit 1254, typically including a low cost microcontroller IC chip, decodes the received radio signal information received by RF oscillator and receiver circuit 1252 to decode the encoded identification data originally encoded into RFID tag 1260. The RFID tag 1210 may be passive (without a battery in the tag) or semi-passive or battery assisted passive (with a battery in the tag) or another class of EPCglobal tags. As used herein, the concept of transmissions from an RFID tag includes passive transmission by, for example, modulated backscattering of the RF signal from an RFID reader.

The RFID tag 1260 contains a transparent window 1262 for receiving light from the laser 1200. The light from the laser 1200 is operated in conjunction with the RF oscillator and receiver 1252 such that light from the laser 1200 enables the RFID tag 1260 when the laser light illuminates circuitry within the laser tag 1260 as more fully explained below.

PDT 100 as shown in FIG. 2 may also include an imaging assembly 1140, which includes image sensor chip 58, illumination subsystem 6316, aiming subsystem 6618, imaging optics 61, and a field programmable gate array ("FPGA") 1180. As shown in FIG. 2, illumination configuration or subsystem 6316 projects an illumination pattern 6390 onto container 1202, while aiming configuration or subsystem 6618 projects an aiming pattern 6392 onto container 1202. Imaging optics 61 focuses an image onto an active surface of image sensor chip 58 which also may include image sensor control circuitry, image signal conditioning circuitry, and an analog-to-digital converter. Operating under the control of processor IC chip 1030, FPGA 1180 manages the capture of image data into RAM 1021.

When trigger button 1050 is actuated with PDT 100 in a bar code decode mode of operation, processor IC chip 1030 automatically sends appropriate control signals to image sensor chip 58. Image sensor chip 58 in response thereto automatically exposes photosensitive pixels of image sensor chip 58 to light and generates image signals. The image signals are thereafter automatically converted into digital values by an analog-to-digital converter. The digital values are received by FPGA 1180 and transferred into RAM 1021 to capture an electronic image representation of container 1202 carrying indicia, such as a bar code symbol 1204. In accordance with a bar code decoding program stored in ROM 1022, processor IC chip 1030 may attempt to decode a bar code symbol represented in the captured electronic image representation. The capture of image data and decoding of image data occur automatically in response to a trigger signal being generated. A trigger signal can be generated when trigger 1050 is actuated. Processor IC chip 1030 may be configured to continuously capture image data and to attempt to decode bar code symbols represented therein as long as trigger 1050 is actuated.

Figure 3:
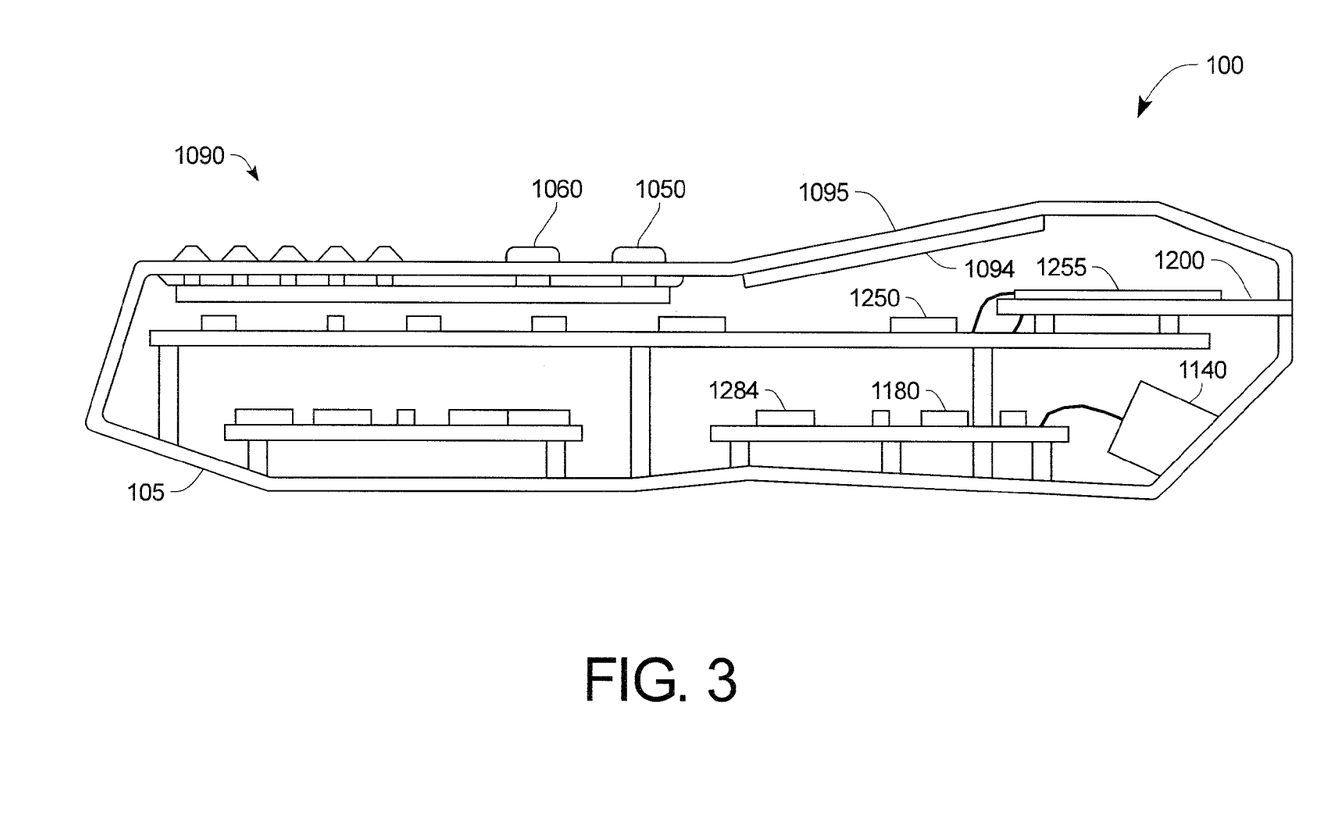
FIG. 3 is a diagrammatical cross section of the indicia reader shown in FIG. 1.

FIG. 3 is a diagrammatical cross section of the PDT 100. As shown in FIG. 3 the laser 1200 projects the laser beam from the front end of the PDT 100. The RFID antenna 1255 may be a directional antenna that is pointed in the same direction as the laser. That is, positioned so that the greatest power radiated from the antenna 1255 is in the same direction as the beam from the laser 1200 to provide better isolation between the signal transmitted by the RFID antenna 1200 and the RFID tag 1260 in situations where other RFID readers are active in the same region as the PDT 100. Thus, signals generated by other RFID tags being activated by other RFID readers will be to some extend isolated from the PDT 100.

Figure 4A:
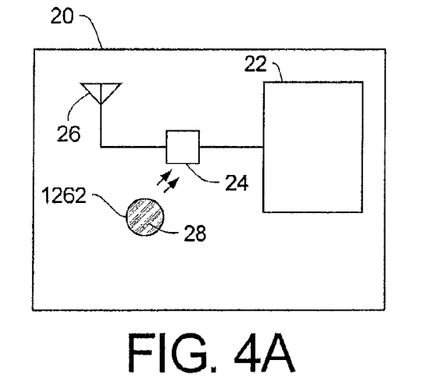
FIGs. 4A, 4B, 4C, 4D, and 4E are combination top views and circuit diagrams of three embodiments of RFID tags which may be used with the indicia reader shown in FIG. 1.

FIGS. 4A, 4B, 4C, 4D, and 4E are RFID tags 20, 30, 40, and 50, respectively, which may be used with the present invention. In FIG. 4A the RFID tag 20 includes a RFID chip 22 coupled through a series photosensitive device 24 to an antenna 26. A transparent window 1262 in the RFID tag 20 package allows light from the laser 1200 to strike the photosensitive device 24. The photosensitive device 24 may be any of several types of photosensitive devices such as a phototransistor, etc. In one embodiment of the invention the photosensitive device 24 is not activated by ambient light such as sunlight, and interior lighting, but is sensitive to light at the frequency produced by the laser 1200 such that the activation of the RFID tag 20 does not occur unless a light within a predetermined frequency range strikes the photosensitive device 24. The photosensitive device 24 is nonconductive in the absence of light that is within the predetermined frequency range thereby isolating the antenna 26 from the RFID chip 22, and is conductive when light from the laser 1200 strikes the device 24 thereby coupling the antenna to the RFID chip 22. The transparent window 1262 may contain a filter 28 which passes the light from the laser 1200, but attenuates light of other frequencies to thereby lessen the possibility of the RFID tag 20 becoming activated at the wrong time.

Figure 4B:
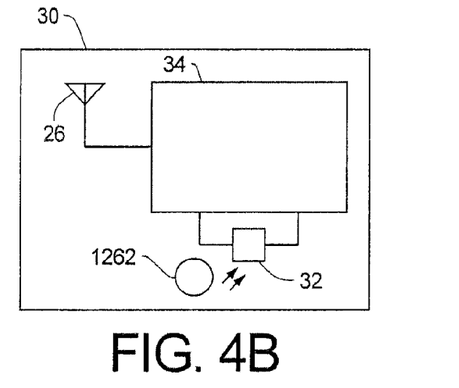

In the embodiment shown in FIG. 4B a photosensitive device 32 is connected to circuit nodes inside a RFID chip 34 and the antenna 26 is connected to the RFID chip 34. The direct connection of the photosensitive device 32 and the RFID chip 34 provides alternative modes of the interaction of the photosensitive device 32 and the RFID chip 34. In one mode the photosensitive device 32 operates in the same manner as the photosensitive device 24 and simply completes a connection between the two nodes inside the RFID chip 34 when made conductive by the laser 1200 which enables the RFID chip 34 to respond to the RFID reader unit 1250, and inhibits the operation of the RFID chip 34 when the connection between the two nodes are blocked by the photosensitive device 32. Alternatively, the RFID chip 34 may detect modulated light pulses from the laser 1200 from the duration of the alternating conductive and nonconductive states of the photosensitive device 32, and enable the RFID chip 34 only when modulated light pulses of a certain type are received by the RFID tag 30. In another variation, the light pulses from the laser 1200 may send data to the RFID chip 34 which causes the RFID chip to enter a mode of operation wherein the RFID chip 34 ignores the status of the photosensitive device 32 and operates as a conventional RFID tag, and also to return to the mode of operation requiring a laser signal to enable the RFID tag 30. Thus, there would be a sequence of light pulses which would enable the RFID tag 30, another sequence of light pulses which would cause the RFID chip 34 to switch to an operational mode in which the RFID tag 30 responds to a conventional reader without a laser light, and a third sequence of pulses which causes the RFID chip to return to the operational mode which requires laser pulses of a predetermined pattern to operate. This capability would allow the RFID tag 30 to respond to other RFID readers which don't have lasers such as may be used in a retail establishment in contrast with a warehouse or a distribution center. Since the photosensitive device 32 is not connected between the antenna 26 and the RFID chip 34, the RF frequency tuning of the RFID tag 30 is not complicated by the RF characteristics of a photosensitive device between the antenna 26 and the RFID chip 34.

Figure 4C:
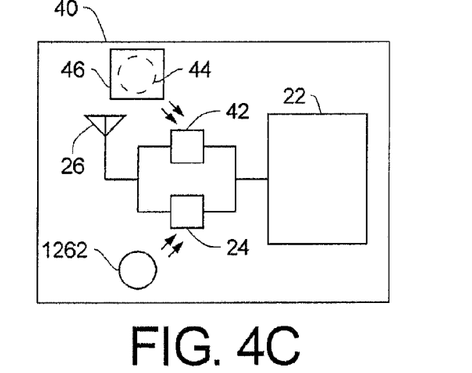

In the embodiment shown in FIG. 4C the RFID tag 40 has a second photosensitive device 42 connected in parallel with the photosensitive device 24 and has a transparent window 44 covered by a light blocking removable patch 46. When the RFID tag 40 is used in an environment where it is desirable to require the laser 1200 for operation of the RFID tag 40, the patch 46 is in place and blocks any light from striking the photosensitive device 42. At another time, when the laser 1200 light is not needed to enable the RFID tag 40, or when RFID readers without lasers are used to read the RFID tag 40, the patch 46 is removed and the photosensitive device 42 completes the circuit between the antenna 26 and the RFID chip 22. In one embodiment the photosensitive device 42 becomes conductive when it receives light anywhere within the visible spectrum such that the RFID tag 40 can be read by a conventional RFID reader anywhere that the RFID tag 40 is exposed to visible light.

Figure 4D:
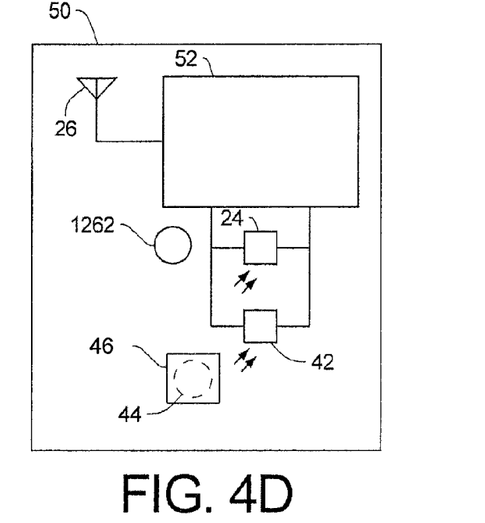

In FIG. 4D a RFID tag 50 has a RFID chip 52 which has photosensitive devices 24 and 42 connected in parallel to internal nodes within the RFID chip 52. In this embodiment, since the photosensitive device 24 discriminates between visible light and light from the laser 1200, the RFID chip 52 does not require pulse decoding circuitry. The photosensitive device 42, the transparent window 44, and the patch 46 operate in the manner described above.

Figure 4E:
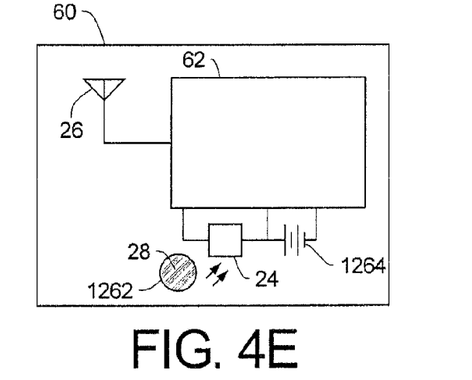

The RFID tag 60 in FIG. 4E has an RFID chip 62 with the battery 1264 connected to it. One terminal of the battery is coupled through the photosensitive device 24 to another connection to the RFID chip 62. The RFID chip receives standby power from the battery 1264 when the photosensitive device 24 is non-conductive and receives full operating power when the photosensitive device 24 is conductive. Thus, when there is insufficient light entering the transparent window 1262 to make the photosensitive device 24 conductive, the RFID tag 60 ignores any RF received signals, and when light from the laser 1200 passes through the transparent window 1262, the photosensitive device 24 becomes conductive at which time the RFID tag 60 will respond to RF signals from the RFID reader 1250. The transparent window 1262 in FIG. 4E may also contain the filter 28.

Figure 5:
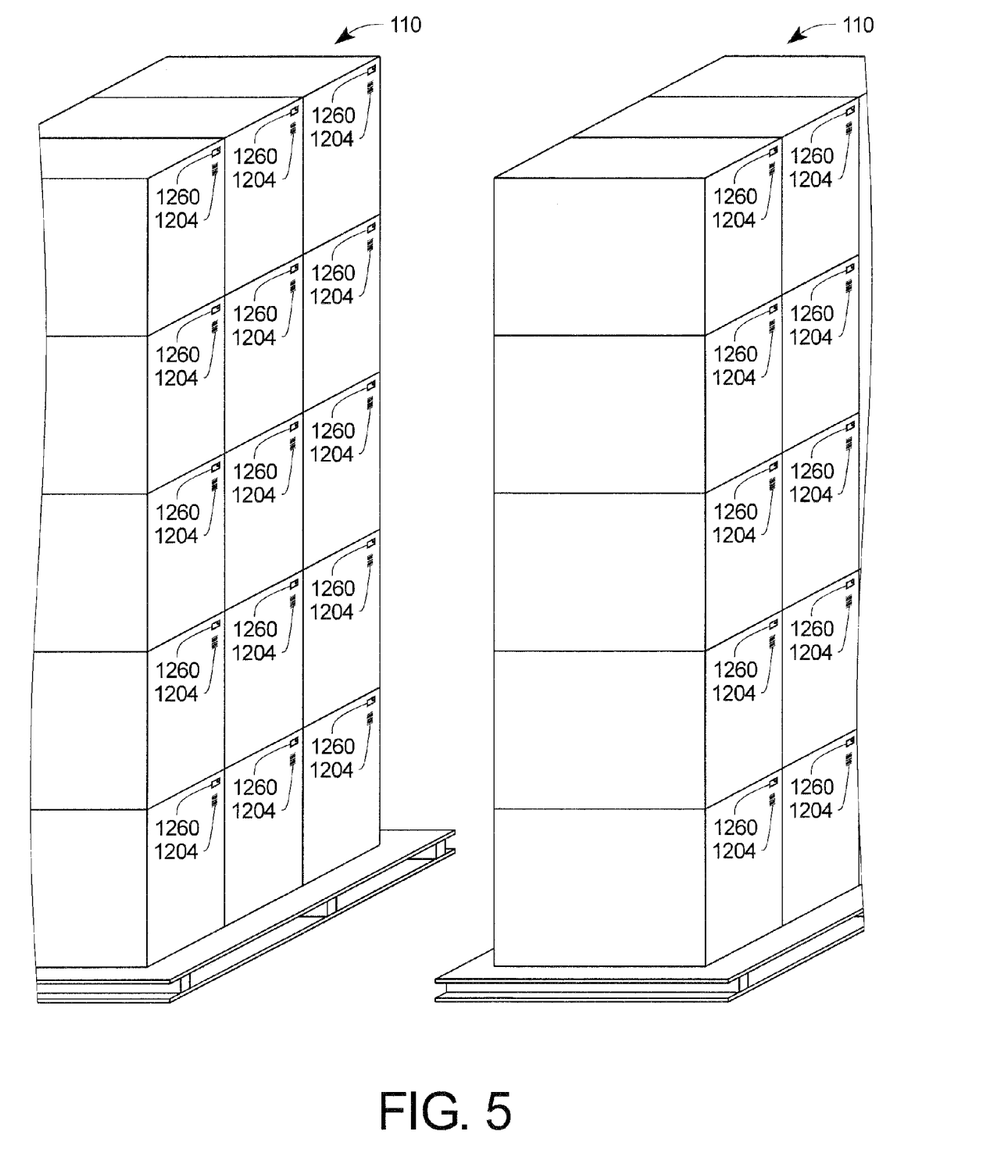
FIG. 5 shows stacks of containers, each of which has the RFID tag shown in FIG. 2.

FIG. 5 shows stacks 110 of containers, each of which has both a bar code 1204 and a RFID tag 1260 which can be laser enabled. The containers at the top of the stacks 110 are too high to be reliably read with a bar code reader, and if the RFID tags on the containers were conventional RFID tags, the data in the RFID tags could not be reliably read with a conventional RFID reader because of the presence of the other RFID tags. The present invention allows the RFID tags 1260 to be reliably read since they can be individually enabled using the PDT 100 by directing the laser light from the laser 1200 onto each of the RFID tags 1260 while activating the RFID reading assembly 1250.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. A data transfer system comprising:
a) a radio frequency identification (RFID) reader disposed in a hand held device comprising:
  i) a radio frequency transmitter and receiver;
  ii) a laser in the hand held device; and
b) a RFID tag on a container comprising:
  i) a tag antenna coupled to an electronic circuit for receiving radio signals from the radio frequency transmitter and transmitting radio frequency signals to the receiver;
  ii) a first photosensitive device coupled to the electronic circuit which is in a first state when light from the laser is not striking the photosensitive device and in a second state when light from the laser is striking the photosensitive device such that the RFID tag transmits a signal only when a light beam from the laser is striking the photosensitive device;
c) wherein the radio frequency transmitter provides power to the RFID tag sufficient to power the electronic circuit and to transmit a signal to the receiver which can be decoded by the RFID reader; and
d) wherein the RFID tag decodes a signal modulating the light beam from the laser wherein only one or more first types of predetermined modulated signals will cause the RFID tag to transmit,
wherein one or more second types of modulated signals will cause the RFID tag to switch to an operating mode wherein the RFID tag will operate irrespective of the state of the first photosensitive device.

2. The system set forth in claim 1 wherein the RFID tag has a transparent window for passing light to the first photosensitive device and wherein the transparent window includes a filter to selectively pass light within a certain frequency range.

3. A method for transmitting radio frequency data from a radio frequency identification (RFID) tag to a RFID reader which is separated from the RFID reader by at least 40 feet comprising the steps of:
transmitting a radio frequency signal from an antenna in the RFID reader to an antenna in a RFID tag which is coupled to an electronic circuit in the RFID tag, the radio frequency signal being of sufficient power to power the electronic circuit and to transmit a signal to the receiver which can be decoded by the RFID reader;
transmitting a laser beam to a first photosensitive device inside the RFID tag which is coupled to an electronic device inside the RFID tag and which, in turn, is coupled to the antenna in the RFID tag,
wherein the RFID tag will transmit a signal back to the RFID reader in response to receiving the signal transmitted from the RFID reader antenna and the laser beam striking the first photosensitive device,
wherein the RFID tag decodes a signal modulating the beam of the laser wherein only one or more first types of predetermined modulated signals will cause the RFID tag to transmit,
wherein one or more second types of modulated signals will cause the RFID tag to switch to an operating mode wherein the RFID tag will operate irrespective of the state of the first photosensitive device.

4. A data transfer system comprising:
a) a radio frequency identification (RFID) reader disposed in a hand held device comprising:
  i) a radio frequency transmitter and receiver;
  ii) a laser in the hand held device; and b) a RFID tag on a container comprising:
  i) a tag antenna coupled to an electronic circuit for receiving radio signals from the radio frequency transmitter and transmitting radio frequency signals to the receiver;
  ii) a first photosensitive device coupled to the electronic circuit which is in a first state when light from the laser is not striking the photosensitive device and in a second state when light from the laser is striking the photosensitive device such that the RFID tag transmits a signal only when a light beam from the laser is striking the photosensitive device;
c) wherein the radio frequency transmitter provides power to the RFID tag sufficient to power the electronic circuit and to transmit a signal to the receiver which can be decoded by the RFID reader; and
d) wherein the RFID tag includes a second photosensitive device coupled to the electronic circuit wherein the RFID tag will operate irrespective of the state of the first photosensitive device when light is striking the second photosensitive device,
e) wherein in one mode of operation of the RFID tag light is prevented from reaching the second photosensitive device and in another mode of operation of the RFID tag light is allowed to reach the second photosensitive device,
wherein a removable light blocking shield is across a transparent window which allows light to pass to the second photosensitive device when the light blocking shield is not present.

5. A method for transmitting radio frequency data from a radio frequency identification (RFID) tag to a RFID reader which is separated from the RFID reader by at least 40 feet comprising the steps of:
  transmitting a radio frequency signal from an antenna in the RFID reader to an antenna in a RFID tag which is coupled to an electronic circuit in the RFID tag, the radio frequency signal being of sufficient power to power the electronic circuit and to transmit a signal to the receiver which can be decoded by the RFID reader;
  transmitting a laser beam to a first photosensitive device inside the RFID tag which is coupled to an electronic device inside the RFID tag and which, in turn, is coupled to the antenna in the RFID tag;
  wherein the RFID tag will transmit a signal back to the RFID reader in response to receiving the signal transmitted from the RFID reader antenna and the laser beam striking the first photosensitive device,
  wherein the RFID tag includes a second photosensitive device coupled to the electronic circuit wherein the RFID tag will operate if no light is striking the first photosensitive device when light is striking the second photosensitive device,
  wherein in one mode of operation of the RFID tag light is prevented from reaching the second photosensitive device and in another mode of operation of the RFID tag light is allowed to reach the second photosensitive device,
  wherein a removable light blocking shield across a transparent window is removed to allow light to pass to the second photosensitive device.

6. A data transfer system comprising:
a) a radio frequency identification (RFID) reader comprising:
  i) a radio frequency transmitter and receiver;
  ii) a laser in the RFID reader; and
b) a RFID tag on a container comprising:
  i) a tag antenna coupled to an electronic circuit for receiving radio signals from the radio frequency transmitter and transmitting radio frequency signals to the receiver;
  ii) a first photosensitive device coupled to the electronic circuit which is in a first state when light from the laser is not striking the photosensitive device and in a second state when light from the laser is striking the photosensitive device such that the RFID tag transmits a signal only when a light beam from the laser is striking the photosensitive device;
c) wherein the radio frequency transmitter provides power to the RFID tag sufficient to power the electronic circuit and to transmit a signal to the receiver which can be decoded by the RFID reader;
d) wherein the RFID tag includes a second photosensitive device coupled to the electronic circuit wherein the RFID tag will operate irrespective of the state of the first photosensitive device when light is striking the second photosensitive device; and,
e) wherein the first photosensitive device is not sensitive to ambient lighting and the second photosensitive device is sensitive to ambient lighting.

7. The system set forth in claim 6 wherein the RFID reader further includes a directional antenna coupled to the radio frequency transmitter and receiver and which is pointed in the same direction as the light from the laser.

8. The system set forth in claim 6 wherein the RFID tag decodes a signal modulating the light beam from the laser wherein only one or more first types of predetermined modulated signals will cause the RFID tag to transmit.

9. The system set forth in claim 8 wherein one or more second types of modulated signals will cause the RFID tag to switch to an operating mode wherein the RFID tag will operate irrespective of the state of the first photosensitive device.

10. The system set forth in claim 6 wherein in one mode of operation of the RFID tag light is prevented from reaching the second photosensitive device and in another mode of operation of the RFID tag light is allowed to reach the second photosensitive device.

11. The system set forth in claim 10 wherein a removable light blocking shield is across a transparent window which allows light to pass to the second photosensitive device when the light blocking shield is not present.

12. A method for transmitting radio frequency data from a radio frequency identification (RFID) tag to a RFID reader which is separated from the RFID reader comprising the steps of:
  transmitting a radio frequency signal from an antenna in the RFID reader to an antenna in a RFID tag which is coupled to an electronic circuit in the RFID tag, the radio frequency signal being of sufficient power to power the electronic circuit and to transmit a signal to the receiver which can be decoded by the RFID reader;
  transmitting a laser beam to a first photosensitive device inside the RFID tag which is coupled to an electronic device inside the RFID tag and which, in turn, is coupled to the antenna in the RFID tag;
  wherein the RFID tag will transmit a signal back to the RFID reader in response to receiving the signal transmitted from the RFID reader antenna and a laser beam striking the first photosensitive device;
  characterized by:
  wherein the RFID tag includes a second photosensitive device coupled to the electronic circuit wherein the RFID tag will operate if no light is striking the first photosensitive device when light is striking the second photosensitive device, wherein the first photosensitive device is not sensitive to ambient lighting and the second photosensitive device is sensitive to ambient lighting.

13. The method set forth in claim 12 wherein the antenna in the RFID reader is a directional antenna which is pointed in the same direction as the transmitted laser beam.

14. The method set forth in claim 12 wherein the RFID tag decodes a signal modulating the beam of the laser wherein only one or more first types of predetermined modulated signals will cause the RFID tag to transmit.

15. The method set forth in claim 14 wherein one or more second types of modulated signals will cause the RFID tag to switch to an operating mode wherein the RFID tag will operate irrespective of the state of the first photosensitive device.

* * * * *